(12) United States Patent
Wasserman et al.

(10) Patent No.: US 12,435,008 B2
(45) Date of Patent: Oct. 7, 2025

(54) AUXETIC MATERIALS AND STRUCTURES FOR CERAMIC MATRIX COMPOSITE AIRFOIL MANDRELS

(71) Applicant: RTX Corporation, Farmington, CT (US)

(72) Inventors: David J. Wasserman, Hamden, CT (US); James T. Roach, Vernon, CT (US)

(73) Assignee: RTX Corporation, Farmington, CT (US)

( * ) Notice: Subject to any disclaimer, the term of this patent is extended or adjusted under 35 U.S.C. 154(b) by 145 days.

(21) Appl. No.: 18/371,070

(22) Filed: Sep. 21, 2023

(65) Prior Publication Data
US 2025/0100941 A1    Mar. 27, 2025

(51) Int. Cl.
*C04B 35/80* (2006.01)
*B64C 1/00* (2006.01)
(Continued)

(52) U.S. Cl.
CPC ........ *C04B 35/80* (2013.01); *C04B 35/62873* (2013.01); *C04B 35/62884* (2013.01);
(Continued)

(58) Field of Classification Search
CPC ........ B28B 21/88; B28B 21/905; B28B 7/34; B29C 33/485; B29C 53/824;
(Continued)

(56) References Cited

U.S. PATENT DOCUMENTS 9,617,857 B2    4/2017  Shuck
10,830,102 B2   11/2020 Martin et al.
(Continued)

FOREIGN PATENT DOCUMENTS

EP    4119772 A1      1/2023
GB    2489457 A      10/2012
WO    2019108203 A1   6/2019

OTHER PUBLICATIONS

"A new method may enable 3D printing complex structures with graphene" from <https://www.graphene-info.com/new-method-may-enable-3d-printing-complex-structures-graphene#:~:text=Hensleigh>, posted Sep. 7, 2018 by Roni Peleg, 4 pages.
(Continued)

*Primary Examiner* — Xiao S Zhao
*Assistant Examiner* — Victoria Bartlett
(74) *Attorney, Agent, or Firm* — Kinney & Lange, P.A.

(57) ABSTRACT

A method of fabricating a ceramic matrix composite component includes fabricating a ceramic preform, the preform comprising a hollow portion with an internal cavity extending along a first axis from a first end to a second end of the hollow portion, supporting the hollow portion with an auxetic mandrel disposed within and the internal cavity and coaxial with the hollow portion, the auxetic mandrel comprising a first mandrel end and a second mandrel end, at least partially densifying the preform with a matrix, and removing the auxetic mandrel from the internal cavity by simultaneously applying a compressive force to each of the first mandrel end and the second mandrel end creating a deformed auxetic mandrel to reduce a cross-sectional profile of the auxetic mandrel along a second axis orthogonal to the first axis, and extracting the deformed auxetic mandrel from the first end of the hollow portion.

15 Claims, 3 Drawing Sheets

(51) Int. Cl.
*C04B 35/628* (2006.01)
*C04B 35/64* (2006.01)
*C04B 35/657* (2006.01)

(52) U.S. Cl.
CPC ............ *C04B 35/64* (2013.01); *C04B 35/657* (2013.01); *B64C 1/00* (2013.01); *B64C 2001/0072* (2013.01); *C04B 2235/422* (2013.01); *C04B 2235/5244* (2013.01); *C04B 2235/5256* (2013.01); *C04B 2235/6028* (2013.01); *C04B 2235/614* (2013.01); *C04B 2235/616* (2013.01)

(58) Field of Classification Search
CPC . B29C 44/357; B64C 1/00; B64C 2001/0072; C04B 2235/422; C04B 2235/5244; C04B 2235/5256; C04B 2235/6028; C04B 2235/614; C04B 2235/616; C04B 2235/94; C04B 35/565; C04B 35/62873; C04B 35/62884; C04B 35/64; C04B 35/657; C04B 35/80; F01D 5/18
See application file for complete search history.

(56) References Cited

U.S. PATENT DOCUMENTS

| | | |
|---|---|---|
| 2002/0005605 A1 | 1/2002 | Dunyak et al. |
| 2003/0175453 A1 | 9/2003 | Steffier |
| 2015/0345320 A1 | 12/2015 | Webb |
| 2017/0057704 A1 | 3/2017 | Li et al. |
| 2017/0328217 A1* | 11/2017 | Gallier .................. F01D 5/288 |
| 2020/0392049 A1 | 12/2020 | Razzell et al. |
| 2021/0079798 A1* | 3/2021 | Backhouse ............... F01D 5/16 |
| 2021/0332756 A1 | 10/2021 | Sharma et al. |
| 2023/0189940 A1 | 6/2023 | Park |

OTHER PUBLICATIONS

Extended European Search Report for EP Application No. 24189773.5, dated Nov. 28, 2024, 13 pages.

* cited by examiner

AUXETIC MATERIALS AND STRUCTURES FOR CERAMIC MATRIX COMPOSITE AIRFOIL MANDRELS

BACKGROUND

The present invention relates to the fabrication of ceramic matrix composites (CMCs), and more particularly to improved tooling for CMC fabrication.

CMC parts are widely fabricated by densifying preforms made from woven fabrics or oriented/braided fiber tows. To keep a preform in a rigid form and maintain proper shape and geometry, specially designed tooling can be used to hold the preform during the initial densification cycle(s). Until the preform is adequately rigidized, the tooling must remain in contact with the preform to maintain integrity of the desired shape. In the case of hollow or cored CMC airfoil construction, the tooling which forms the internal surfaces (i.e., a mandrel) must remain inside the part until it is partially or fully rigidized. In some instances, an issue may arise when attempting to extract the mandrel after the component has been rigidized if the geometry is highly complex, or if substantial surface deviations exist. Thus, means for extracting mandrels from preforms without damaging the preforms and/or mandrels are desirable.

SUMMARY

A method of fabricating a ceramic matrix composite component includes fabricating a ceramic preform, the preform comprising a hollow portion with an internal cavity extending along a first axis from a first end to a second end of the hollow portion, supporting the hollow portion with an auxetic mandrel disposed within and the internal cavity and coaxial with the hollow portion, the auxetic mandrel comprising a first mandrel end and a second mandrel end, at least partially densifying the preform with a matrix, and removing the auxetic mandrel from the internal cavity by simultaneously applying a compressive force to each of the first mandrel end and the second mandrel end creating a deformed auxetic mandrel to reduce a cross-sectional profile of the auxetic mandrel along a second axis orthogonal to the first axis, and extracting the deformed auxetic mandrel from the first end of the hollow portion.

A deformable mandrel for use in fabricating a ceramic preform includes a body extending along a first axis between a first mandrel end and a second mandrel end. The body is formed from an auxetic material engineered to deform along a second axis orthogonal to the first axis when a uniaxial force is applied to the first mandrel end and the second mandrel end.

Figure 1:
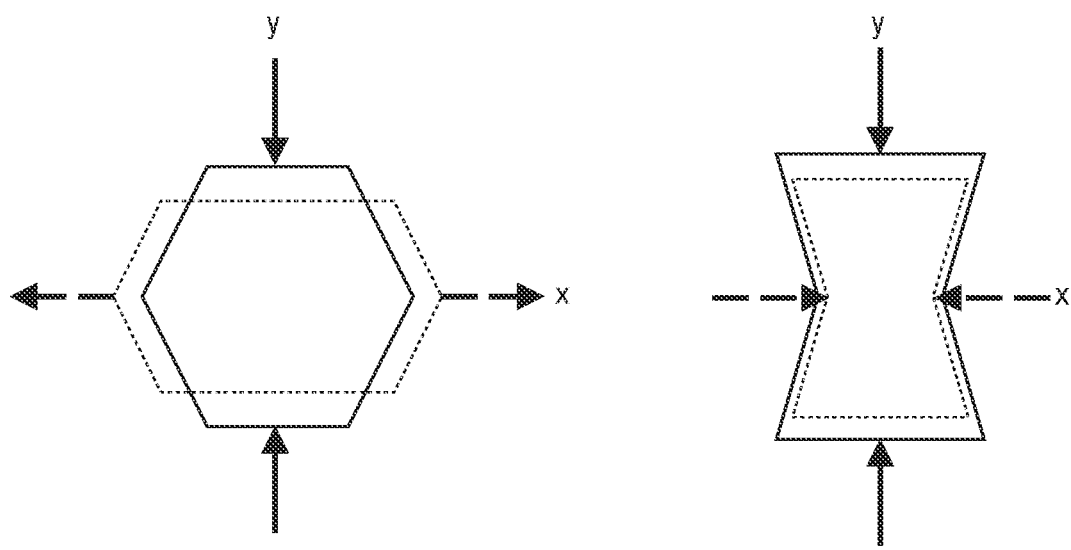
FIG. 1 is a schematic illustration comparing the properties of a non-auxetic material and an auxetic material.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents auxetic tooling for use in the fabrication of CMC components. FIG. 1 schematically illustrates properties of a non-auxetic, or conventional material (left) and an auxetic material (right) under a compressive force. The non-auxetic material on the left has a positive Poisson's ratio such that, when a uniaxial compressive force is applied in the y-direction, the non-auxetic material compresses/contracts in y-direction and expands in an orthogonal direction (e.g., the x-direction). The opposite can also be true as a uniaxial stretching force in the y-direction causes expansion in the y-direction and contraction in the x-direction. Conversely, the auxetic material on the right has a negative Poisson's ratio such that, when a uniaxial compressive force is applied in the y-direction, the auxetic material contracts in both the y-direction and the x-direction. If a uniaxial stretching force is instead applied in the y-direction, the auxetic material expands in both the y-direction and the x-direction. Accordingly, auxetic tooling, such as mandrels, can be used with and more easily removed from complexly shaped preforms, such as airfoils, due to their unique properties.

Figure 2:
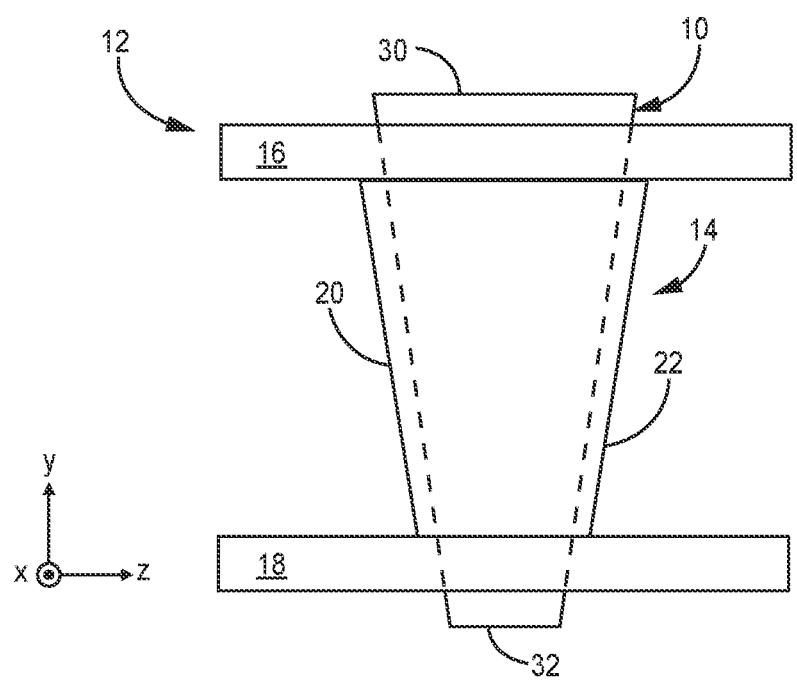
FIG. 2 is a simplified side view of a vane preform supported by an auxetic mandrel.

FIG. 2 is a simplified side view of auxetic mandrel 10 supporting ceramic vane preform 12. Portions of mandrel 10 are represented in dashed lines where internal to vane preform 12. Vane preform 12 includes airfoil 14 extending between first, outer diameter (OD) platform 16 and second, inner diameter (ID) platform 18. Airfoil 14 includes leading edge 20 and oppositely disposed trailing edge 22. Airfoil 14 further includes pressure sidewall 24 and oppositely disposed suction sidewall 26 (both shown and labeled in FIG. 3). Airfoil 14 may be complexly shaped with at least one internal cavity 28 (shown and labeled in FIG. 3) for improved aerodynamic performance. In an alternative embodiment, airfoil 14 can belong to a blade preform without departing from the scope of the invention. Vane preform 12 can be formed from fabrics, tapes, and/or braids of ceramic (e.g., silicon carbide) fibers arranged in various woven or non-woven architectures. The fibrous ceramic material can be laid up around/braided on mandrel 10 to form vane preform 12 in some embodiments.

Mandrel 10 can include first, OD end 30 and second, ID end 32 corresponding to the relative locations of OD and ID platforms 16 and 18. The external geometry of mandrel 10 can correspond to the internal geometry of airfoil 14 (i.e., cavity 28). A compressive force can be applied to ID and OD ends 30 and 32 (i.e., in the y-direction) to cause contraction of mandrel 10 in an orthogonal direction as is discussed in greater detail below. In an exemplary embodiment, mandrel 10 can be formed from graphene engineered for auxetic behavior. Due to the relatively high operational temperatures (i.e., above 1500° K) of graphene, mandrel 10 formed from graphene is ideally suited for use in a furnace/reactor, such as the type used in chemical vapor infiltration (CVI), melt infiltration (MI), and polymer infiltration and pyrolysis (PIP). Any of these methodologies can be used to densify vane preform 12 with a ceramic matrix. In such an embodiment, interconnected sheets of graphene can be 3D printed to form mandrel 10.

In an alternative embodiment, mandrel 10 can instead be formed from an engineered metal, polymer, ceramic, or composite material. Any auxetic material used with an operational temperature below that of the CVI, MI, or PIP processes (i.e., approximately 1700° C., 1450° C., or 1050° C., respectively) can be instead formed into a preforming mandrel 10, which can be used through the preforming process to support a preform prior to the application of interface coatings (e.g., of boron nitride) via CVI and/or densification via CVI, MI, and/or PIP. In yet another alternative embodiment, mandrel 10 can be a hybrid mandrel with portions formed from an auxetic material, and portions formed from a non-auxetic material (e.g., graphite, refractory metals, carbon-carbon composite).

Figure 3:
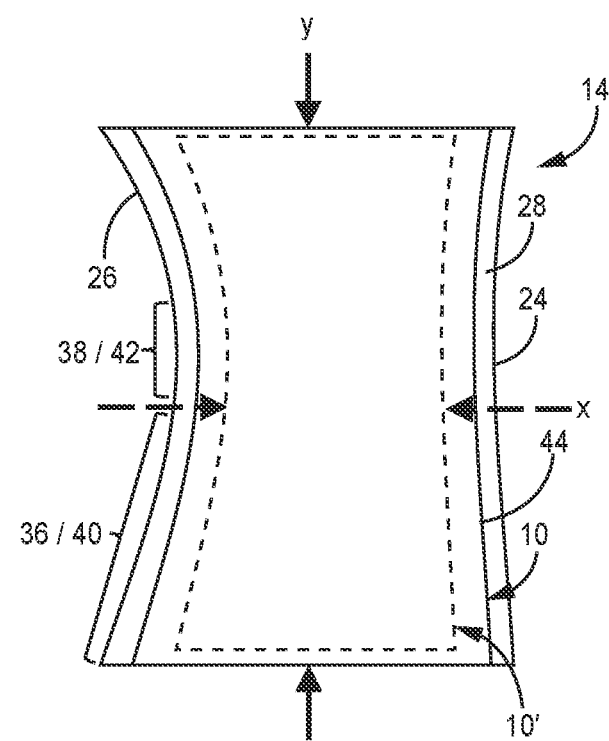
FIG. 3 is a schematic cross-sectional illustration of a portion of the airfoil of the vane preform and auxetic mandrel.

FIG. 3 is a schematic cross-sectional illustration of a portion of airfoil 14 in which airfoil 14 is rotated roughly 90° from the view in FIG. 2 such that pressure sidewall 24 and suction sidewall 26 are visible, as well as airfoil inner cavity 28, in which mandrel 10 is disposed. Mandrel 10 can extend at least the full length (i.e., in the y-direction) of cavity 28. As shown in FIG. 3, suction sidewall 26 is curved (i.e., bowed) and mandrel 10 is correspondingly curved. Curvature creates flared region 36 in suction sidewall 24 which transitions into reduced thickness region 38, referring to the reduced distance between suction sidewall 26 and pressure sidewall 24. In order to sufficiently support airfoil 14, mandrel 10 includes a corresponding flared region 40 and reduced thickness region 42, referring to the reduced region between walls 44 of mandrel 10.

Referring back to FIG. 2 and with continued reference to FIG. 3, if mandrel 10 is extracted from cavity 28 in the positive y-direction (based on the coordinates shown in FIG. 2), flared region 40 of mandrel 10 is likely to contact/catch on reduced thickness region 38 of airfoil 14. In such a scenario, a conventional graphite mandrel could potentially damage the internal surfaces of airfoil 14 and/or fracture due to the brittle nature of graphite. However, with auxetic mandrel 10, a simultaneous compressive force can be applied to OD and ID ends 30 and 32 of mandrel 10 (i.e., in the y-direction) to cause mandrel 10 to contract in the x-direction, creating deformed mandrel 10', represented in FIG. 3 with dashed lines. Stated another way, mandrel 10' can be deformed by compression in the y-direction to have a reduced cross-sectional profile along the x-direction, including flared region 40, which is consequently narrower than reduced thickness region 38 of airfoil 14. This deformation facilitates its removal from cavity 28 without damage to vane preform 12 or mandrel 10. In general, mandrel 10 can remain in the deformed state (i.e., as mandrel 10') so long as the compressive force is applied. Further, it should be noted that mandrel 10 is generally removed from vane preform 12 after densification with a matrix using one of the methodologies listed above if fabricated from an appropriate material, but a preforming-type mandrel 10 can be removed prior to application of interface coatings, if applicable, or densification.

In one example, the uniaxial compressive force can be applied by hand, in particular for a relatively small vane preform 12. This can include an operator using both hands to apply the compressive force and extract mandrel 10' from inner cavity 28, as well as using a stationary object, such as a tabletop, to apply the compressive force at one end while the opposing compressive force is applied by hand. In a second example, a tool, and more specifically, a clamping tool (e.g., c-clamp, screw clamp, bar clamp, etc.) can be inserted through the hollow mandrel 10 and actuated to apply the compressive force. In an alternative embodiment, a clamping tool can be positioned externally to vane preform 12 to apply the uniaxial force to mandrel 10.

In an alternative embodiment, mandrel 10 can be engineered to have a reduced cross-sectional profile along the z-direction shown in FIG. 2 in response to an applied uniaxial compressive force in the y-direction. This can occur in addition to, or alternatively to the reduction in the x-direction as shown in FIG. 3 depending on the material selected. Leading edge 20 and/or trailing edge 22 can be complexly shaped (e.g., with tapering or curvature) creating correspondingly shaped surfaces of internal cavity 28. In such an embodiment, an applied uniaxial force in the y-direction can create a deformed mandrel 10' which is deformed along the z-direction.

The disclosed auxetic mandrel can be used in the fabrication of CMC components for use in aerospace, maritime, or industrial equipment, to name a few, non-limiting examples.

Discussion of Possible Embodiments

The following are non-exclusive descriptions of possible embodiments of the present invention.

A method of fabricating a ceramic matrix composite component includes fabricating a ceramic preform, the preform comprising a hollow portion with an internal cavity extending along a first axis from a first end to a second end of the hollow portion, supporting the hollow portion with an auxetic mandrel disposed within and the internal cavity and coaxial with the hollow portion, the auxetic mandrel comprising a first mandrel end and a second mandrel end, at least partially densifying the preform with a matrix, and removing the auxetic mandrel from the internal cavity by simultaneously applying a compressive force to each of the first mandrel end and the second mandrel end creating a deformed auxetic mandrel to reduce a cross-sectional profile of the auxetic mandrel along a second axis orthogonal to the first axis, and extracting the deformed auxetic mandrel from the first end of the hollow portion.

The method of the preceding paragraph can optionally include, additionally and/or alternatively, any one or more of the following features, configurations and/or additional steps:

In the above method, the preform can be a vane preform and the hollow portion can be an airfoil.

In any of the above methods, the step of fabricating the ceramic preform can include laying up a ceramic material over the auxetic mandrel.

In any of the above methods, the ceramic material can include silicon carbide fibers.

In any of the above methods, the auxetic mandrel can be formed from graphene.

In any of the above methods, the auxetic mandrel can be formed from one of a metal, a polymer, a ceramic, and a composite material.

In any of the above methods, the step of at least partially densifying the preform with a ceramic matrix can be carried out using chemical vapor infiltration.

In any of the above methods, the step of at least partially densifying the preform with a ceramic matrix can be carried out using polymer infiltration and pyrolysis or melt infiltration.

In any of the above methods, the airfoil can include a first sidewall, a second sidewall, and a reduced thickness region therebetween.

In any of the above methods, the auxetic mandrel can include a flared region corresponding to a flared region of the first sidewall.

In any of the above methods, in the deformed auxetic mandrel, a cross-sectional profile of the flared region of the auxetic mandrel can be less than the reduced thickness region of the airfoil.

In any of the above methods, the step of removing the auxetic mandrel from the airfoil can include moving the flared region of the auxetic mandrel through the reduced thickness region of the airfoil.

In any of the above methods, the compressive force can be applied to each of the first mandrel end and the second mandrel end by hand.

In any of the above methods, the compressive force can be applied to each of the first mandrel end and the second mandrel end using a tool.

In any of the above methods, the tool can be a clamp.

A deformable mandrel for use in fabricating a ceramic preform includes a body extending along a first axis between a first mandrel end and a second mandrel end. The body is formed from an auxetic material engineered to deform along a second axis orthogonal to the first axis when a uniaxial force is applied to the first mandrel end and the second mandrel end.

The mandrel of the preceding paragraph can optionally include, additionally and/or alternatively, any one or more of the following features, configurations and/or additional components:

In the above mandrel, the auxetic material can be graphene.

In any of the above mandrels, the mandrel can be suitable for use in a furnace for at least one of a chemical vapor infiltration, polymer infiltration and pyrolysis, and melt infiltration process.

In any of the above mandrels, the auxetic material can be one of a metal, a polymer, a ceramic, and a composite.

In any of the above mandrels, the body can include a flared region and a reduced thickness region.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of fabricating a ceramic matrix composite component, the method comprising:
   fabricating a ceramic preform, the preform comprising a hollow portion with an internal cavity extending along a first axis from a first end to a second end of the hollow portion;
   supporting the hollow portion with an auxetic mandrel disposed within and the internal cavity and coaxial with the hollow portion, the auxetic mandrel comprising a first mandrel end and a second mandrel end;
   at least partially densifying the preform with a matrix; and
   removing the auxetic mandrel from the internal cavity by:
      simultaneously applying a compressive force to each of the first mandrel end and the second mandrel end creating a deformed auxetic mandrel to reduce a cross-sectional profile of the auxetic mandrel along a second axis orthogonal to the first axis; and
      extracting the deformed auxetic mandrel from the first end of the hollow portion.

2. The method of claim 1, wherein the preform is a vane preform, and wherein the hollow portion is an airfoil.

3. The method of claim 2, wherein the step of fabricating the ceramic preform comprises laying up a ceramic material over the auxetic mandrel.

4. The method of claim 3, wherein the ceramic material comprises silicon carbide fibers.

5. The method of claim 2, wherein the auxetic mandrel is formed from graphene.

6. The method of claim 2, wherein the auxetic mandrel is formed from one of a metal, a polymer, a ceramic, and a composite material.

7. The method of claim 2, wherein the step of at least partially densifying the preform with a ceramic matrix is carried out using chemical vapor infiltration.

8. The method of claim 2, wherein the step of at least partially densifying the preform with a ceramic matrix is carried out using polymer infiltration and pyrolysis or melt infiltration.

9. The method of claim 2, wherein the airfoil comprises:
   a first sidewall;
   a second sidewall; and
   a reduced thickness region therebetween.

10. The method of claim 9, wherein the auxetic mandrel comprises a flared region corresponding to a flared region of the first sidewall.

11. The method of claim 10, wherein in the deformed auxetic mandrel, a cross-sectional profile of the flared region of the auxetic mandrel is less than the reduced thickness region of the airfoil.

12. The method of claim 11, wherein the step of removing the auxetic mandrel from the airfoil comprises moving the flared region of the auxetic mandrel through the reduced thickness region of the airfoil.

13. The method of claim 2, wherein the compressive force is applied to each of the first mandrel end and the second mandrel end by hand.

14. The method of claim 2, wherein the compressive force is applied to each of the first mandrel end and the second mandrel end using a tool.

15. The method of claim 14, wherein the tool is a clamp.

* * * * *